United States Patent
Bauman

(10) Patent No.: US 6,726,176 B2
(45) Date of Patent: Apr. 27, 2004

(54) STEPPED BUTTERFLY VALVE

(75) Inventor: Hans D. Bauman, Rye, NH (US)

(73) Assignee: Fisher Controls International, Inc., Marshalltown, IA (US)

( * ) Notice: Subject to any disclaimer, the term of this patent is extended or adjusted under 35 U.S.C. 154(b) by 198 days.

(21) Appl. No.: 10/038,703

(22) Filed: Jan. 2, 2002

(65) Prior Publication Data
US 2003/0122100 A1 Jul. 3, 2003

(51) Int. Cl.⁷ ................................................ F16K 1/22
(52) U.S. Cl. ........................................ 251/305; 251/306
(58) Field of Search ................................ 251/118, 120, 251/121, 305, 306

(56) References Cited

U.S. PATENT DOCUMENTS

| | | | |
|---|---|---|---|
| 2,114,168 A | 4/1938 | Auger | 251/11 |
| 3,442,489 A | 5/1969 | Cary et al. | 251/305 |
| 3,680,833 A | 8/1972 | McNeely, Jr. | 251/283 |
| 3,779,512 A | 12/1973 | Scaramucci | 251/308 |
| 3,809,361 A | 5/1974 | Pfundstein et al. | 251/305 |
| 3,877,678 A | 4/1975 | Jung | 251/305 |
| 4,005,849 A | 2/1977 | Lorthiois | 251/305 |
| 4,037,819 A | 7/1977 | Kindersley | 251/306 |
| 4,083,529 A | 4/1978 | Santy et al. | 251/175 |
| 4,194,722 A | 3/1980 | Okerblom | 251/305 |
| 4,281,817 A | 8/1981 | Adams et al. | 251/305 |
| 4,296,915 A | 10/1981 | Baumann | 251/174 |
| 4,327,765 A | 5/1982 | Wilson et al. | 137/312 |
| 4,469,305 A | 9/1984 | Baumann | 251/305 |
| 4,479,510 A | 10/1984 | Bey | 137/625.31 |
| 4,540,457 A | 9/1985 | LaValley | 156/182 |
| 4,623,121 A | 11/1986 | Donnelly | 251/306 |
| 4,691,894 A | 9/1987 | Pyötsiä et al. | 251/127 |
| 4,712,768 A | 12/1987 | Herr et al. | 251/305 |
| 4,770,393 A | 9/1988 | Huberston | 251/306 |
| 5,102,097 A | 4/1992 | Davis et al. | 251/283 |
| 5,158,265 A | 10/1992 | Miyairi | 251/305 |
| 5,160,118 A | 11/1992 | Stary | 251/173 |
| 5,193,572 A | 3/1993 | Le Devehat | 137/244 |
| 5,326,077 A | 7/1994 | Spencer et al. | 251/306 |
| 5,465,756 A | 11/1995 | Royalty et al. | 137/625.31 |
| 5,685,520 A | 11/1997 | Velan | 251/306 |
| 5,741,006 A | 4/1998 | Murai et al. | 251/305 |
| 5,881,995 A | 3/1999 | Tse et al. | 251/305 |
| 5,934,647 A | 8/1999 | Marbach | 251/306 |
| 6,029,949 A | 2/2000 | Brown et al. | 251/305 |
| 6,047,950 A | 4/2000 | Pontoppidan et al. | 251/305 |
| 6,079,695 A | 6/2000 | Gasaway et al. | 251/305 |

FOREIGN PATENT DOCUMENTS

| | | |
|---|---|---|
| DE | 2359717 | 6/1975 |
| DE | 19846728 A1 | 5/2000 |
| EP | 780608 A1 | 6/1997 |
| JP | 61-278667 | 12/1986 |
| JP | 2-118288 | 5/1990 |
| JP | 4-337167 | 11/1992 |

*Primary Examiner*—Edward K. Look
*Assistant Examiner*—John K Fristoe, Jr.
(74) *Attorney, Agent, or Firm*—Lahive & Cockfield LLP

(57) ABSTRACT

A valve having improved inherent flow characteristics, improved noise characteristics, and improved dynamic torque characteristics is provided. The valve includes a disk for controlling fluid flow inside the valve. The disk has a first vane and a second vane disposed relative to the first vane. In accordance with one embodiment, the second vane is disposed along an axis extending from a pivot point of the disk. In such an embodiment, the first vane is disposed offset from the second vane. The first vane and the second vane can be substantially parallel. The valve further includes an upstream indentation for dynamic torque reduction and can include noise and cavitation reducing features on a downstream side of the disk and/or an indentation for dynamic torque reduction in case of a fluid flow reversal.

37 Claims, 6 Drawing Sheets

STEPPED BUTTERFLY VALVE

FIELD OF THE INVENTION

The present invention relates to valves, and more particularly to a modified butterfly valve having a stepped rotating vane.

BACKGROUND OF THE INVENTION

Conventional butterfly valves operate by positioning a disk within a duct to control fluid flow through the duct. The disk rotates about a pivot point or axis defined by a shaft mounted within the duct. Rotation of the disk, resulting from a torque applied to the shaft, creates or reduces an opening for fluid to flow through the duct. The fluid flow can be controlled by adjusting the angle of rotation of the disk within in the duct.

In many applications making use of butterfly valves, several factors are taken into consideration when choosing a particular butterfly valve having predetermined flow characteristics for each application. One factor is the desire for an improved inherent flow characteristic, which is the ratio between the flow coefficient (Cv) and the travel in degrees of rotation of the disk. The flow coefficient Cv represents the pressure drop or flow capacity of a valve. Manufacturers of valves often publish flow coefficients together with equations for predicting flow versus pressure drop for a particular valve. The flow coefficient can be different for liquids versus gases.

A second factor that can be important in many applications is the desire for reduced noise. This is achieved by providing a higher coefficient of incipient cavitation in combination with a lower aerodynamic noise efficiency. In other words, a valve less likely to experience cavitation will have reduced noise characteristics. Cavitation occurs with a liquid flowing through a valve. Cavitation is the two-stage process of vaporization and condensation of a liquid. Vaporization of a liquid occurs when the liquid begins to boil. This is also known as flashing. In a valve, this vaporization occurs when the pressure of the liquid is lowered, instead of an increase in the temperature. As fluid passes through a valve downstream of the disk area, there is an increase in velocity or kinetic energy that is accompanied by a substantial decrease in pressure or potential energy. If the pressure in this area falls below that of the vapor pressure of the fluid flowing through the valve, vaporization occurs. Vapor bubbles then continue downstream where the velocity of the fluid begins to slow and the pressure in the fluid recovers. The vapor bubbles then collapse. Cavitation can affect flow rates and can cause mechanical damage to valves and piping. Incipient cavitation relates to the early stages of cavitation. In the early stages, the bubbles are small, and there is a hissing-type noise. Further information regarding the characteristics and consequences of cavitation can be found in *Preventing Cavitation in Butterfly Valves*, CHEMICAL ENGINEERING, Mar. 18, 1985, pp. 149–153.

A third factor relates to a desire for an improved dynamic torque characteristic, which reduces the amount of torque required to control the flow of fluid through the valve. As the fluid flows through the valve, a force is generated against the disk as it impedes the fluid flow. The amount of torque required to rotate the disk to open or close the valve will vary depending on characteristics of the fluid flow and the shape and orientation of the disk.

SUMMARY OF THE INVENTION

There is a need in the art for a butterfly valve having improved inherent flow characteristics, improved noise characteristics, and improved dynamic torque characteristics. The present invention is directed to further solutions that address this need.

In accordance with one example embodiment of the present invention, a valve includes a disk for controlling fluid flow inside the valve. The disk has a first vane and a second vane disposed relative to the first vane. The first vane forms a sealing surface, and the second vane forms a fluid obstructing surface. In accordance with one embodiment of the invention, the second vane is disposed along an axis extending from a pivot point of the disk. In such an embodiment, the first vane is disposed offset from the second vane. The first vane and the second vane can be substantially parallel to each other.

In accordance with another embodiment of the present invention, the disk includes an indentation along an upstream side of the disk, suitable for dynamic torque reduction. The indentation can take the form of a substantially concave curved surface, or concavity. Alternatively, the indentation can be formed from a ramp surface angled relative to a vertical axis.

In accordance with one aspect of the present invention, at least one aperture, or slot, is disposed along a downstream side of the disk for reduction of cavitation and/or aerodynamic noise.

In accordance with further aspects of the present invention, at least one of the first and second vanes can have a substantially L-shaped profile. The first and second vanes can also be formed of a cavity disposed along a periphery of the disk.

In accordance with still another aspect of the present invention, a third vane can be disposed on the disk relative to the first and second vanes. The third vane can have a second fluid obstructing surface.

In accordance with yet another aspect of the present invention, a valve is provided having a pivotable disk. A first vane is disposed on the pivotable disk and a second vane is disposed relative to the first vane on the pivotable disk. The first vane has a sealing surface and the second vane has a fluid obstructing surface. The valve can be a butterfly valve.

In accordance with the teachings of the present invention, the valve can position the second vane along an axis extending from a pivot point of the disk.

In accordance with still another aspect of the present invention, a wall of a valve housing can be substantially concave to enable the first and second vanes to rotate in close proximity to the wall. The distance between the outer periphery of the first or second vane and the wall can be gradually enlarged to provide for a desired flow characteristic.

In accordance with yet another aspect of the present invention, the first vane can provide a first pressure drop of a fluid passing through the valve and the second vane can provide a second pressure drop of the fluid passing through the valve.

In accordance with further aspects of the present invention, an indentation can be provided along an upstream side of the disk for dynamic torque reduction. The indentation can be in the form of a substantially concave curve, or a ramp angled relative to a vertical axis. At least one aperture can be disposed along a downstream side of the disk for a reduction of at least one of cavitation and aerodynamic noise. Further, at least one indentation can be disposed along a downstream side of the second vane for reduction of hydrodynamic torque.

At least one of the first and second vanes can have a substantially L-shaped profile. In addition, the first and second vanes can be formed of a cavity disposed along a periphery of the disk. A third vane can be disposed on the disk relative to the first and second vanes.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
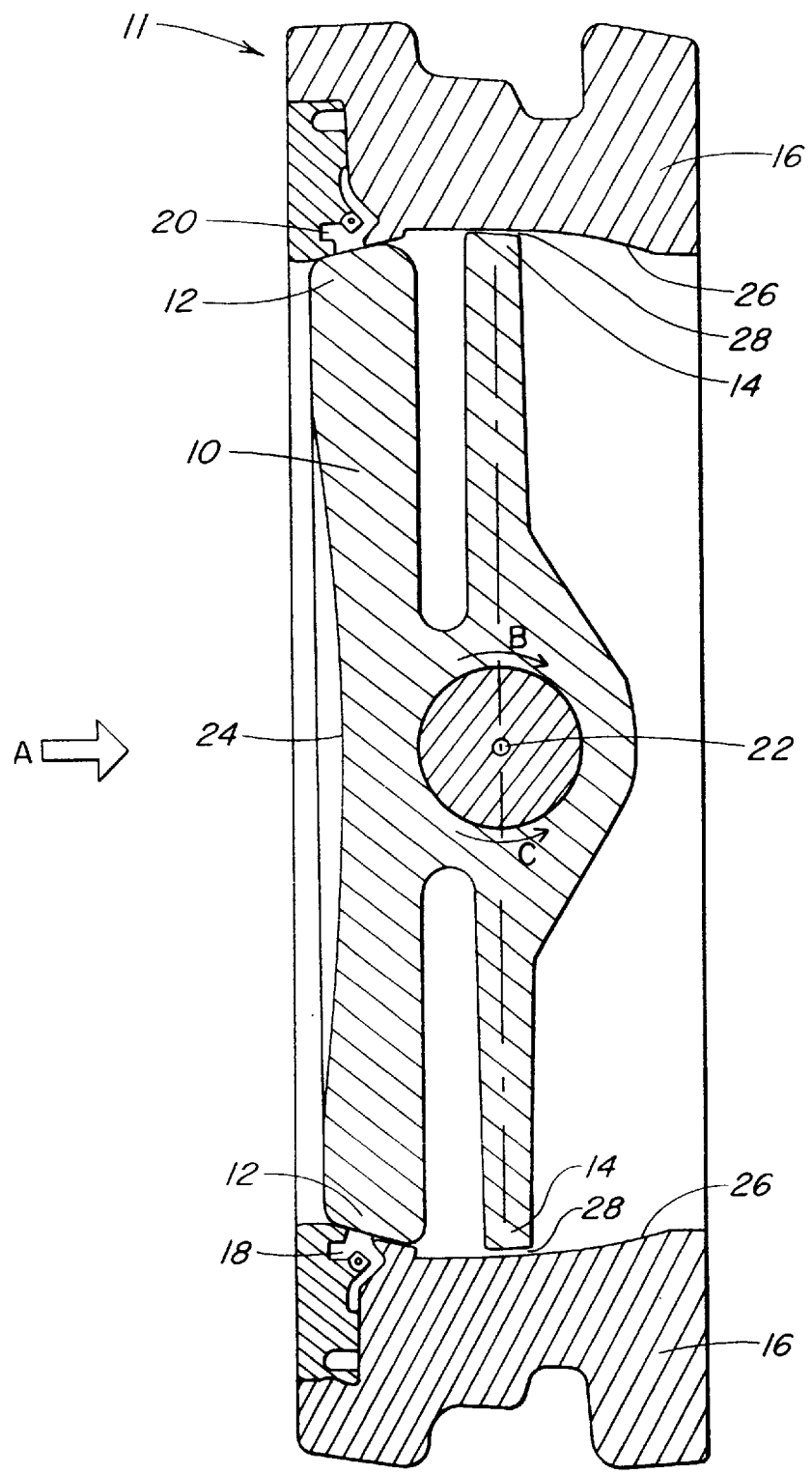
FIG. 1 is a diagrammatic cross-section of a valve according to one aspect of the present invention.

An illustrative embodiment of the present invention relates to a valve containing a flow control disk having a stepped vane, which is a disk having two or more vanes in series. The second vane provides approximately twice the normal fluid impedance versus a typical single vane arrangement up to approximately a 45-degree rotation of the disk. The valve housing additionally has a reduced diametrical section that cooperates with the secondary vane to obtain a desired flow area in series with the first vane; The resulting valve has a more gradual opening characteristic, yielding an equal percentage flow characteristic. An equal percentage flow characteristic is characterized by a valve having no need for flow control close to the point of shutoff where a vane otherwise sticks in the seal of the valve housing. This is typically between zero and ten degrees of rotation.

FIGS. 1 through 6, wherein like parts are designated by like reference numerals throughout, illustrate an example embodiment of a stepped butterfly valve, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

FIG. 1 illustrates a valve 11 having a disk 10 mounted therein in accordance with one embodiment of the present invention. The disk 10 serves as an impediment to fluid flow through the valve 11, such that movement of the disk 10 can increase, decrease, or suspend fluid flow through the valve 11.

The valve 11 includes a valve housing 16. The disk 10 has a first vane 12 extending between walls of the valve housing 16. In addition, seals 18 and 20 mount within an interior portion of the valve housing 16. The seals 18 and 20 compress against the first vane 12 of the disk 10 to seal the valve 11 closed and prevent fluid flow. It should be noted, that the valve 11 is shown in a closed position.

A second vane 14 is disposed on the disk 10 in a manner substantially parallel with the first vane 12. The second vane 14 lies substantially along a vertical axis passing through a disk 10 pivot point 22. The second vane 14 also extends to the valve housing 16, however, the second vane 14 does not make contact with the valve housing 16. Instead, the second vane 14 maintains a marginal clearance 28 with the wall of the valve housing 16. This marginal clearance 28 serves as a fluid obstructing surface, however, the seal does not necessarily provide one-hundred percent impedance to fluid flow. Rather, the marginal clearance 28 of the fluid obstructing surface provides at least a substantial impedance to fluid flow.

The inclusion of the marginal clearance 28 formed by the second vane 14 leads to a valve having approximately twice the normal fluid impedance versus a typical single vane valve up to approximately a 45 degree valve opening. The zero to 45 degree valve openings represent the highest-pressure drops experienced by fluid flowing through the valve 11. The increased fluid impedance leads to the valve 11 having a more gradual opening characteristic, yielding an equal percentage flow characteristic. Again, the equal percentage flow characteristic is characterized by a valve having no need for flow control close to the point of shutoff where a vane otherwise sticks in the seal 18 or 20 of the valve housing. The equal percentage flow characteristic provides for equal increments of flow at constant pressure drop for each increment of travel. This is typically between zero and 10 degrees of rotation.

A reduced diametrical section 26 of the valve housing 16 maintains the marginal clearance 28 between the second vane 14 and the valve housing 16 during rotation of the disk 10. As illustrated, fluid typically flows in the direction of arrow A in FIG. 1. Therefore, the disk 10 rotates in the direction of arrow B to open, and in the direction of arrow C to close. One of ordinary skill in the art will appreciate that the direction of fluid flow through the valve 11, and the orientation of the disk 10 within the valve 11, can vary. The disk 10 rotates, or pivots, about the pivot point 22 formed by, e.g., a shaft. As the disk 10 rotates, the first vane 12 and the second vane 14 follow along the reduced diametrical section 26 of the valve housing 16.

A radius of curvature of the reduced diametrical section 26 determines the size of the marginal clearance 28 as the disk 10 rotates about the pivot point 22. As the disk 10 rotates, the radius of curvature of the reduced diametrical section 26 can increase, thus causing the marginal clearance 28 to increase and allow more fluid flow or less fluid flow impedance. One of ordinary skill in the art will appreciate that the shape of the reduced diametrical section 26 can vary depending on desired flow characteristics.

Figure 2:
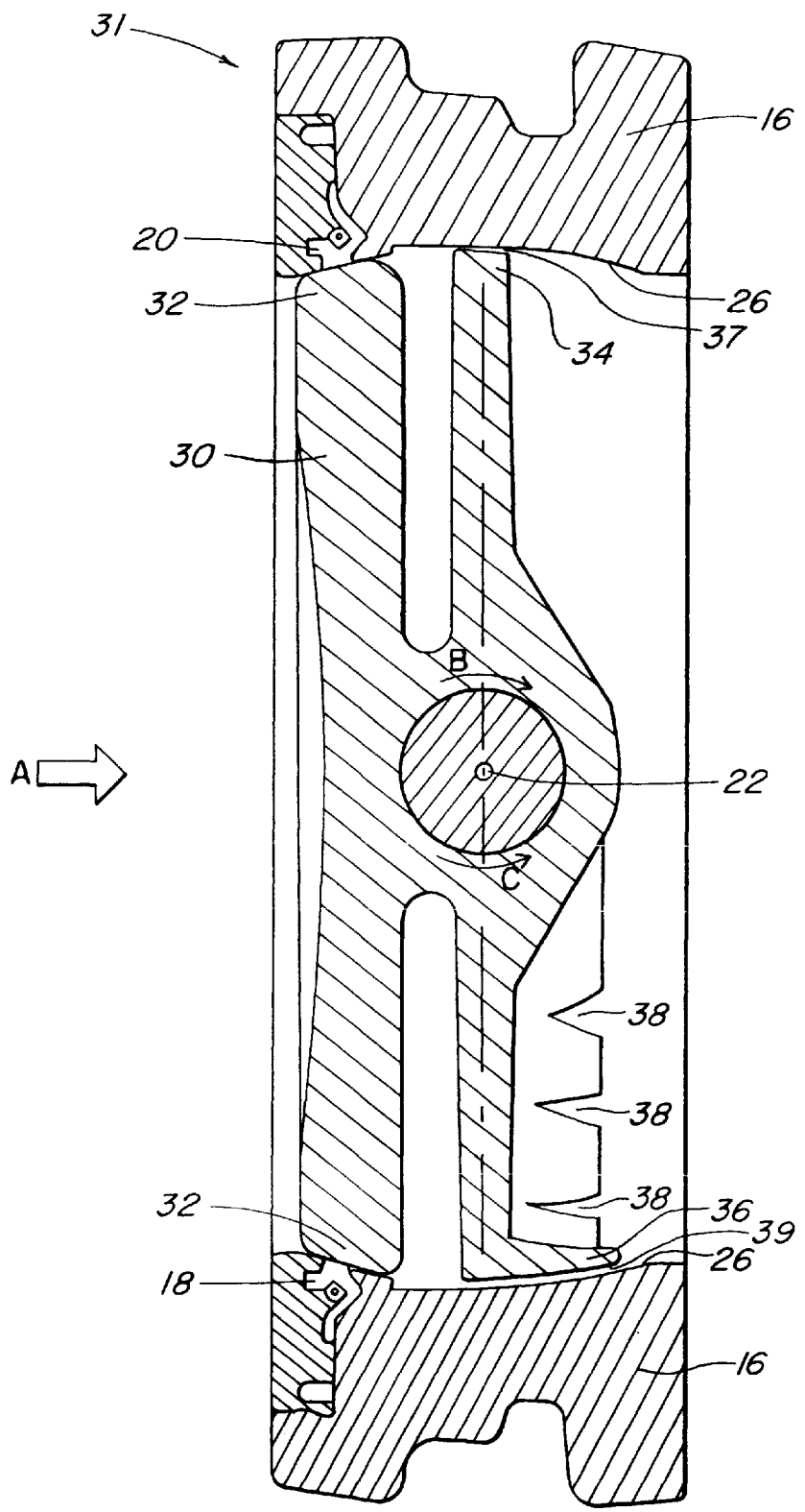
FIG. 2 is a diagrammatic cross-section of a valve in accordance with another aspect of the present invention.

FIG. 2 is a diagrammatic cross-section of a second embodiment in accordance with the teachings of the present invention. A valve 31 is provided having a disk 30 rotatably mounted therein about the pivot point 22. The disk 30 has a first vane 32 that extends to seal with the seals 18 and 20 along the wall portion of the valve housing 16 when in the closed position as illustrated. A second vane 34 extends along the vertical axis from the pivot point 22. The second vane 34 maintains a marginal clearance 37 with the wall of the valve housing 16. As with the embodiment of FIG. 1, the marginal clearance 37 serves as a fluid obstructing surface for the valve 31.

At a lower portion of the second vane 34, an L-shaped vane section 36 extends at approximately a right angle from the vertical axis. An outer edge of the L-shaped vane section 36 is slightly curved at substantially a same radius of curvature as the wall of the reduced diametrical section 26 to form a marginal clearance 39 between the L-shaped vane section 36 and the wall of the valve housing 16. As before, the valve housing 16 maintains the reduced diametrical section 26, which the L-shaped vane section 36 follows as the disk 30 rotates about the pivot point 22. The radius of curvature of the L-shaped vane section 36 can vary and differ from the radius of curvature of the reduced diametrical section 26 to effect a different marginal clearance 39 and different flow characteristics, as desired.

In addition to the L-shaped vane section 36, a plurality of slots 38 extends along a back portion of the disk 30 in the L-shaped vane section 36. The L-shaped vane section 36 and the slots 38 serve to reduce noise caused by cavitation, or high gas throttling velocities. In other words, the L-shaped vane section 36 and the slots 38 provide a higher coefficient of incipient cavitation and lower aerodynamic noise efficiency. As a fluid flows through the valve 31, the upstream side of the disk 30 impedes the flow. The fluid passes through the disk 30, along the second vane 34 and through the marginal clearances 37 and 39, to the downstream side of the disk 30. The fluid more gradually depressurizes as it flows through the disk and over the L-shaped vane section 36 and the slots 38. Size, dimensions, and shape of the L-shaped vane section 36 and the slots hinder cavitation and add to the overall flow rate reduction. This reduces the cavitation effects and resulting noise. These characteristics also yield greater flow reduction at low angular displacements of the disk 30.

Figure 3:
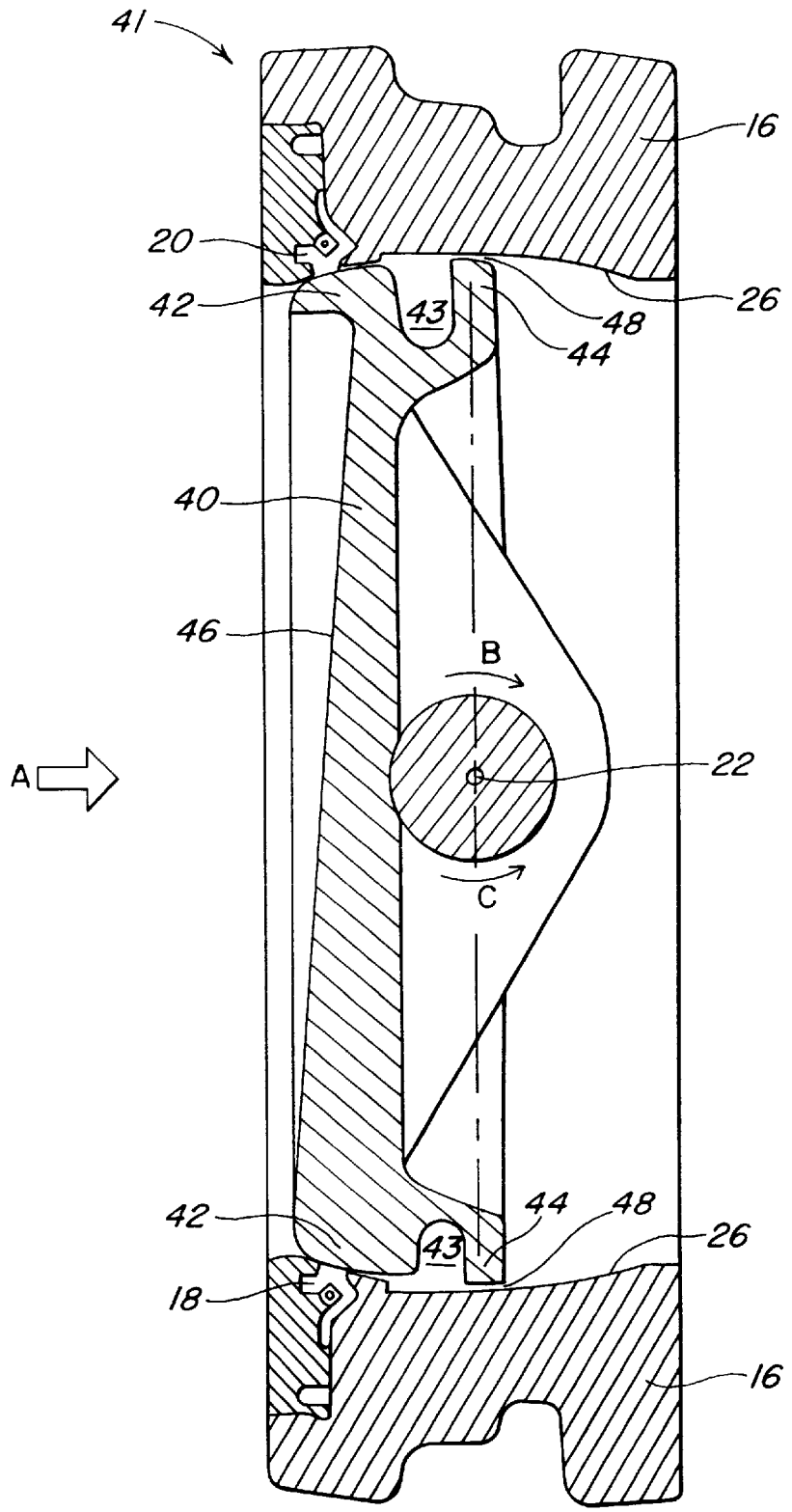
FIG. 3 is a diagrammatic cross-section of a valve in accordance with still another aspect of the present invention.

FIG. 3 illustrates yet another embodiment in accordance with the teachings of the present invention. A valve 41 supports a disk 40 that is pivotably mounted on, e.g., a shaft at the pivot point 22. A first vane 42 is offset from the vertical axis passing through the pivot point 22 and extends to meet the seals 18 and 20 mounted in the wall of the valve housing 16. When the valve 41 is in a closed position, the first vane 42 compresses against the seals 18 and 20 to substantially impede or stop the fluid flow.

A groove 43 disposed around the periphery of the disk 40 forms the divide between the first vane 42 and a second vane 44. The groove 43 is relatively shallower than cavities formed in the other embodiments between the vanes. The length of the second vane 44 as it extends toward the valve housing 16 and the reduced diametrical section 26 is also relatively shorter than second vanes of other embodiments. Therefore, a reduced fluid flow is able to pass through the groove 43 when the disk 40 is partially rotated.

A marginal clearance 48 exists between ends of the second vane 44 and the wall of the valve housing 16. The reduced diametrical section 26 of the valve housing 16 allows the first vane 42 and the second vane 44 to pass along the valve housing 16 during rotation while maintaining the marginal clearance 48. The groove 43 of the disk 40 serves to provide an abrupt impediment to an upper flow jet of fluid flow along the periphery of the first vane 42. It should be noted that the marginal clearance 48 can differ between the upper and lower half of the second vane 44.

The disk 40 also includes an indentation in the form of a ramped cavity 46 extending along an upstream side of the disk 40. The ramped cavity 46 is an alternative to the concave indentation of the concavity 24 in FIG. 1 to provide dynamic torque reduction. As the upstream fluid flow intersects with the ramped cavity 46 when the disk 40 is rotated beyond about 40 degrees, the ramp portion prevents wall attachment and the resultant low static pressure that normally causes a high torque. The angle of the ramped cavity 46 can vary to provide different amounts of dynamic torque reduction.

Figure 4:
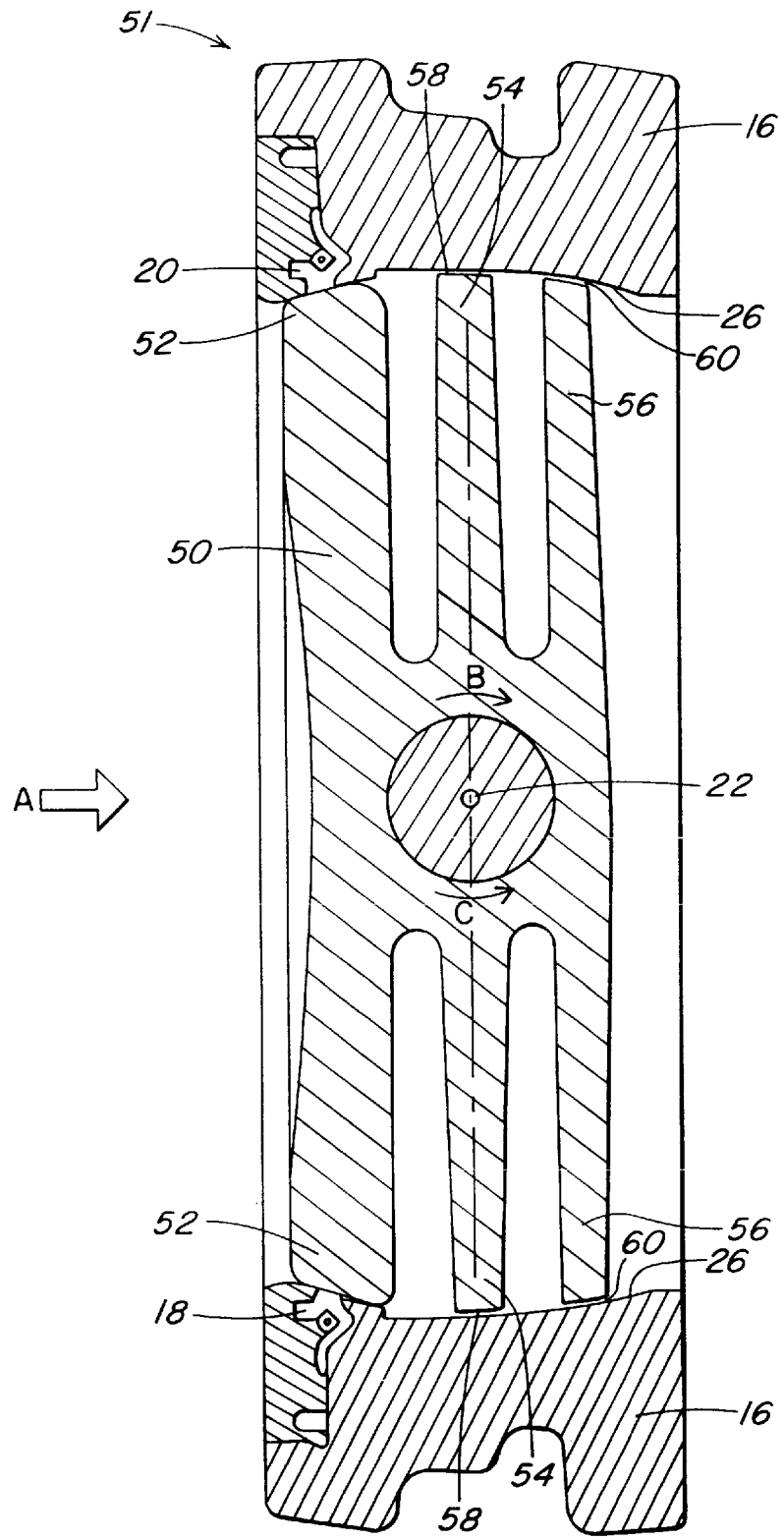
FIG. 4 is a diagrammatic cross-section of a valve in accordance with yet another aspect of the present invention.

Another embodiment is illustrated in FIG. 4 in accordance with the teachings of the present invention. A valve 51 is provided having a disk 50 pivotably mounted therein about the pivot point 22. A first vane 52 extends to meet with the seals 18 and 20 mounted within the valve housing 16. This is the primary source of flow control. A second vane 54 is disposed along a vertical axis passing through the pivot point 22 and substantially parallel with the first vane 52. The second vane 54 extends substantially to the walls of the valve housing 16, leaving a first marginal clearance 58 therebetween. The second vane 54 provides a fluid obstructing surface. A third vane 56 is disposed at a downstream side of the disk 50, offset from the vertical axis passing through the pivot point 22, and substantially parallel with the second vane 54. The third vane 56 extends substantially to the wall of the valve housing 16, maintaining a second marginal clearance 60 therebetween. The third vane 56 provides a second fluid obstructing surface.

As in previous embodiments, the valve housing 16 maintains the reduced diametrical section 26. The first vane 52, the second vane 54, and the third vane 56 follow along the curvature of the reduced diametrical section 26 as the disk 50 pivots about the pivot point 22 within the valve housing 16. Therefore, this embodiment provides a sealing surface at the seals 18 and 20, in addition to the first and second marginal clearances 58 and 60, which provide additional sealing ability with the first and second fluid obstructing surfaces.

The added third vane 56 further improves the inherent flow characteristics and the noise characteristics of the valve 51. The third vane 56, by providing a third flow path, provides further impediment to the fluid flow, and makes the depressurization of the fluid on the downstream side of the valve more gradual. One of ordinary skill in the art will appreciate that there can be different numbers of vanes other than those shown in the illustrated embodiments. The size, shape, and number of vanes are determined by the particular application for the valve being constructed. Multiple pressure drop stagings as provided by the third vane 56 results in a slower fluid velocity per given stage between each vane 52, 54, and 56. The slower velocity is important for gaseous media, since the aerodynamic noise varies up to the 6.5 power of the jet velocity as further detailed in the paper *Noise and Cavitation Characteristics of Rotary Control Valves*, PROCEEDINGS OF THE 41$^{ST}$ ANNUAL SYMPOSIUM ON INSTRUMENTATION FOR THE PROCESS INDUSTRIES, Tex. A&M University, Jan. 22, 1986.

Figure 5:
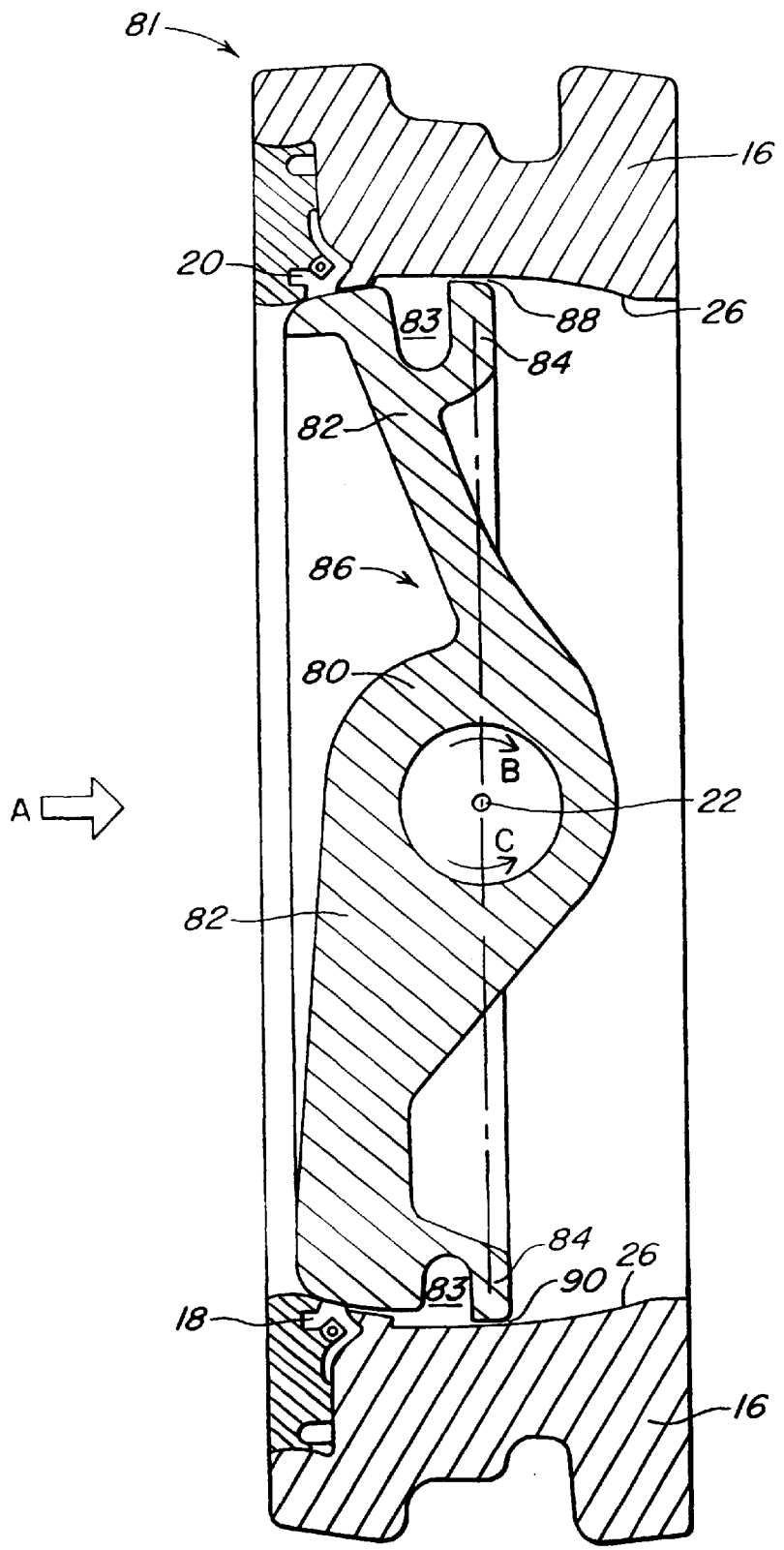
FIG. 5 is a diagrammatic cross-section of a valve in accordance with still another aspect of the present invention.

Another embodiment is illustrated in FIG. 5 in accordance with the teachings of the present invention. A valve 81 is provided having a disk 80 pivotably mounted therein about the pivot point 22. A first vane 82 extends to meet with the seals 18 and 20 mounted within the valve housing 16. The first vane 82 serves as the primary source of flow control. The first vane 82 differs from other embodiments in that it is irregularly shaped and forms an irregular indentation 86 on the upstream side of the disk 80. The irregular indentation 86 is embodied as a substantial portion of the first vane 82 being tilted or angled relative to the vertical axis and relative to a second vane 84. The angle of the tilted or angled portion is greater than about 10 degrees. The irregular indentation 86 serves to prevent dynamic torque reversal near wide open valve 81 positions.

A second vane 84 is disposed along a vertical axis passing through the pivot point 22 and substantially parallel with the first vane 82. The second vane 84 extends substantially to the walls of the valve housing 16, leaving a first marginal clearance 88 therebetween. The second vane 84 is formed of a groove 83 as in the embodiment of FIG. 3 and provides a fluid obstructing surface.

The valve housing 16 maintains the reduced diametrical section 26. The first vane 82 and the second vane 84 follow along the curvature of the reduced diametrical section 26 as the disk 80 pivots about the pivot point 22 within the valve housing 16. Therefore, this embodiment provides a sealing surface at the seals 18 and 20, in addition to the first and second marginal clearances 88 and 90, which provide additional sealing ability with the fluid obstructing surface of the second vane 88. The disk 80 further includes a rear indentation 71. The rear indentation 71 is suitable for reducing dynamic torque, in a like manner to the irregular indentation 86, in the event the flow direction is reversed.

One of ordinary skill in the art will appreciate that there can be different shaped vanes other than those shown in the illustrated embodiments. The size, shape, relative angle, and number of vanes will be determined by the particular application for the valve being constructed.

Figure 6:
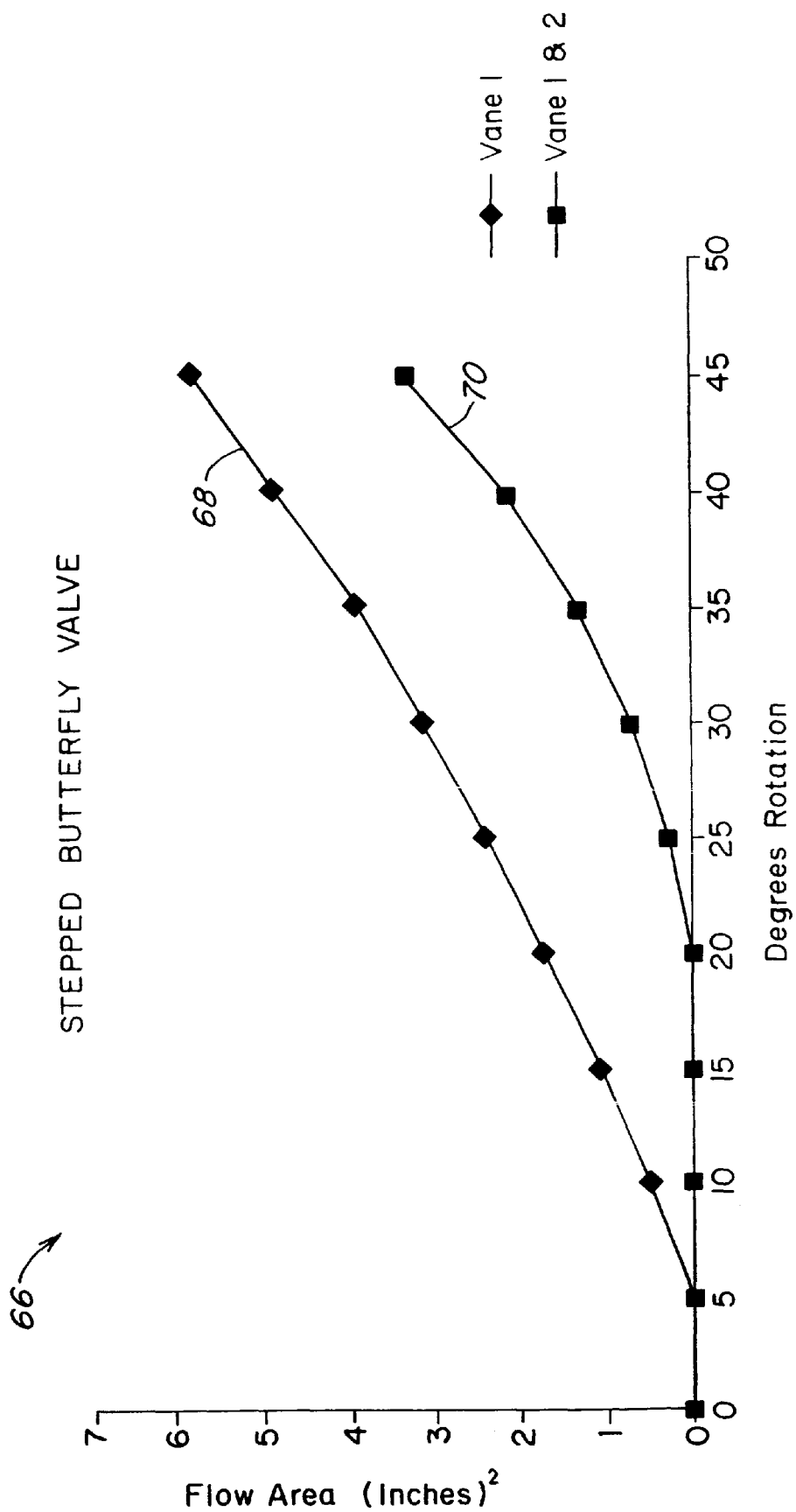
FIG. 6 is a graph plotting flow area versus degrees of rotation of a valve disk in accordance with one aspect of the present invention.

FIG. 6 is a graph 66 illustrating the relationship between the flow area and the degrees of rotation of a disk within a valve as fluid flows therethrough. Two sets of data are plotted on the graph 66. A first set represents the flow characteristics of fluid flowing through a valve having a conventional single vane as depicted in a vane 1 line 68. The second set of data represents flow characteristics of fluid flow through a valve having two vanes in accordance with the teachings of the present invention. The result is shown in a vanes 1 and 2 line 70.

Between the degrees of rotation of zero and five, both arrangements of vanes appear to operate relatively similarly with respect to the amount of flow area exposed. Between the degrees of rotation of five and approximately twenty, the valve having only a single vane experiences an increase in flow area of about 1.8 square inches. The valve having a stepped disk of two vanes experiences zero to a minimal amount of flow area increase. Line 68 continues for the valve having a single vane with a rapid increase in flow area relative to degrees of rotation between twenty and forty-five. Line 70 continues with a more gradual increase of flow area as the degrees of rotation increase between twenty and forty-five. At the maximum degrees of rotation of 45 degrees, the single vane valve has approximately 5.75 square inches of flow area available for fluid flow, while the valve having two vanes has approximately 3.33 square inches of flow area available for fluid flow. A benefit of such gradual opening near the seating position, or the lower degrees of rotation, is that there is less of a need for flow control close to the point of valve shutoff. The range between zero and ten degrees of rotation in the valve having two or more vanes, a range where there are often valve shutting and hammering issues, does not experience such issues for the configuration in accordance with the teachings of the present invention. The two vane structure reduces the overall flow area for the valve, versus the single vane structure. However, the overall size and dimensions of the valve can be increased if a greater flow area is desired.

In operation, as the disk 10, 30, 40, and 50 rotates about the pivot point 22, the first vane 12, 32, 42 and 52 passes beyond the seal 18 to open the valve for some minimal fluid flow. The fluid flow is minimal because the fluid enters the region between the first vane 12, 32, 42, and 52 and the second vane 14, 34, 44, and 54, where the fluid can slowly escape through the marginal clearance 28, 39, 48, and 58, and also along the second vane 14, 34, 44, and 54. A larger volume of fluid flow does not occur until the disk 10, 30, 40 and 50 rotates in the direction of arrow A in an amount sufficient for the second vane to pass over the lower seal 18. In the instance of the three vane embodiment of FIG. 4, a larger volume of fluid flow does not occur until the third vane 56 passes over the lower seal 18. The slow and gradual increase of the fluid flow improves the inherent flow characteristics, noise characteristics, and dynamic torque characteristics of the valve containing the disks of the present invention.

To close the valve, the disk 10, 30, 40, and 50 rotates in the direction of arrow B. Depending on the particular valve arrangement either the third vane 56 or the second vane 14, 34, or 44 is the first to reach the lower seal 18 and pass over the seal 18. As the vane passes over the seal the fluid flow impedes, but still flows through the marginal clearance 28, 39, 48, or 60 and along the second vane 14, 34, 44, and 54. Additional rotation of the disk 10, 30, 40, or 50 brings additional vanes 12, 32, 42, 52, or 54 to pass over the lower seal 18 and the upper seal 20 to gradually reduce fluid flow, and eventually shut off the valve 11, 31, 41, or 51. The gradual reduction of fluid flow improves the slow, cavitation, and torque characteristics.

The present invention features a valve, illustrated in the form of a butterfly valve, having a rotating disk modified to include a plurality of vanes in addition to other characteristics. The disks can further include indentations at an upstream or downstream side to improve dynamic torque characteristics of the valves. In addition, one or more of the vanes can have alternative shapes, such as L-shapes, in addition to slots on a downstream side of the disks to provide for noise reduction. The inclusion of the L-shaped vanes further yields even greater flow reduction at low degrees of rotation. A groove or cavity between the multiple vanes provides an abrupt impediment to an upper or lower flowing jet of fluid flow. Further, the gradual opening characteristics near the seating position provides for an equal percentage flow characteristic valve.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A disk for controlling fluid flow inside a valve having an upstream side and a downstream side, the disk comprising:

a first vane having a sealing surface; and an imperforate second vane disposed relative to the first vane, the second vane having a fluid obstructing surface on the upstream side and the downstream side of the disk forcing fluid to flow across the second vane when the disk is in a partially open position.

2. The disk according to claim 1, wherein the second vane is disposed along an axis extending from a pivot point of the disk.

3. The disk according to claim 2, wherein the first vane is disposed offset from the second vane.

4. The disk according to claim 1, wherein the first vane and the second vane are substantially parallel to each other.

5. The disk according to claim 1, further comprising an indentation formed along the upstream side of the disk for dynamic torque reduction.

6. The disk according to claim 5, wherein the indentation comprises at least one of a substantially concave curved surface and a ramp surface angled relative to a vertical axis.

7. The disk according to claim 1, further comprising at least one aperture disposed along the downstream side of the disk for reducing at least one of cavitation and aerodynamic noise.

8. The disk according to claim 1, wherein a central cross-section of at least one of the first and second vanes comprises a substantially L-shaped profile.

9. The disk according to claim 1, wherein the disk includes a cavity disposed along a periphery thereof, the cavity forming the first and second vanes.

10. The disk according to claim 1, further comprising a third vane disposed on the disk, the third vane having a second fluid obstructing surface.

11. The disk according to claim 1, wherein the disk is suitable for use in a butterfly valve.

12. The disk according to claim 1, wherein a substantial portion of a planary surface of the first vane is angularly offset from a remaining planary surface of the first vane to hinder dynamic torque reversal.

13. The disk according to claim 1, wherein the disk further comprises at least one concave feature on the downstream side to reduce dynamic torque in the event of a reversal in fluid flow direction.

14. A valve, comprising:
 a housing having an inlet, an outlet, and a bore therethrough, the bore having a substantially concave surface forming an internal wall;
 a valve shaft operably mounted within the bore; and
 a pivotable disk operably mounted to the valve shaft, the pivotable disk comprising a first vane disposed on the pivotable disk and having a sealing surface, and a second vane disposed relative to the first vane on the pivotable disk, the second vane having an imperforate fluid obstructing surface forcing fluid flow across the second vane when the disk is in a partially open position;
 wherein the first vane and the second vane rotate in close proximity to the substantially concave surface to create a predetermined fluid pressure drop.

15. The valve according to claim 14, wherein the valve is a butterfly valve.

16. The valve according to claim 14, wherein the second vane is mounted along an axis extending from a pivot point of the disk.

17. The valve according to claim 14, wherein the distance between the outer periphery of the first or second vane and said wall is gradually enlarged to provide for a desired flow characteristic.

18. The valve according to claim 14, wherein outer peripheries of the first vane and the second vane are substantially parallel.

19. The valve according to claim 14, wherein the first vane provides a first pressure drop of a fluid passing through the valve and the second vane provides a second pressure drop of the fluid passing through the valve.

20. The valve according to claim 14, further comprising an indentation along an upstream side of the disk for dynamic torque reduction.

21. The valve according to claim 14, wherein the indentation comprises at least one of a substantially concave indentation and a ramp angled relative to a vertical axis.

22. The valve according to claim 14, further comprising at least one aperture disposed along a downstream side of the disk for reduction of at least one of cavitation and aerodynamic noise.

23. The valve according to claim 14, wherein at least one of the first and second vanes comprises a substantially L-shaped profile.

24. The valve according to claim 14, wherein the disk includes a cavity disposed along a periphery thereof, the cavity forming the first and second vanes.

25. The valve according to claim 14, further comprising a third vane disposed on the disk relative to the first and second vanes, the third vane having a second fluid obstructing surface.

26. A disk for controlling fluid flow inside a valve having an upstream side and a downstream side, the disk comprising:
 a first vane having a sealing surface; and
 a second vane disposed along an axis extending from a pivot point of the disk relative to the first vane, the second vane having an imperforate fluid obstructing surface forcing substantial fluid flow across the second vane when in a partially open position.

27. The disk according to claim 26, wherein the first vane is disposed offset from the second vane.

28. The disk according to claim 26, wherein the first vane and the second vane are substantially parallel to each other.

29. The disk according to claim 26, further comprising an indentation formed along the upstream side of the disk for dynamic torque reduction.

30. The disk according to claim 29, wherein the indentation comprises at least one of a substantially concave curved surface and a ramp surface angled relative to a vertical axis.

31. The disk according to claim 26, further comprising at least one slot disposed along the downstream side of the disk for reducing at least one of cavitation and aerodynamic noise.

32. The disk according to claim 26, wherein a central cross-section of at least one of the first and second vanes comprises a substantially L-shaped profile.

33. The disk according to claim 26, wherein the disk includes a cavity disposed along a periphery thereof, the cavity forming the first and second vanes.

34. The disk according to claim 26, further comprising a third vane disposed on the disk, the third vane having a second fluid obstructing surface.

35. The disk according to claim 26, wherein the disk is suitable for use in a butterfly valve.

36. The disk according to claim 26, wherein a substantial portion of a planary surface of the first vane is angularly offset from a remaining plenary surface of the first vane to hinder dynamic torque reversal.

37. The disk according to claim 26, wherein the disk further comprises at least one concave feature on the downstream side to reduce dynamic torque in the event of a reversal in fluid flow direction.

* * * * *